US012594612B2

(12) United States Patent     (10) Patent No.:    US 12,594,612 B2

Lutzker              (45) Date of Patent:       Apr. 7, 2026

(54) SOFFIT SAW AND EXTENSION

(71) Applicant: Joseph Lutzker, Lawndale, CA (US)

(72) Inventor: Joseph Lutzker, Lawndale, CA (US)

( * ) Notice: Subject to any disclaimer, the term of this patent is extended or adjusted under 35 U.S.C. 154(b) by 469 days.

(21) Appl. No.: 18/099,934

(22) Filed: Jan. 21, 2023

(65) Prior Publication Data

US 2024/0246158 A1     Jul. 25, 2024

(51) Int. Cl.
    *B23B 51/12*       (2006.01)
    *B23B 51/04*       (2006.01)

(52) U.S. Cl.
    CPC ........ *B23B 51/126* (2013.01); *B23B 51/0426* (2013.01); *B23B 51/0473* (2013.01)

(58) Field of Classification Search
    CPC ....... B23B 31/06; B23B 31/107; B23B 51/12; B23B 51/126; B23B 51/0426; B23B 51/0473; B23B 2251/62; B23B 2260/094; B23B 45/003; Y10T 408/95; Y10T 408/90993
    See application file for complete search history.

(56) References Cited

U.S. PATENT DOCUMENTS

| | | | | | |
|---|---|---|---|---|---|
| 2,721,592 | A | * | 10/1955 | Baker | .................... B23Q 1/703 408/206 |
| 3,011,369 | A | * | 12/1961 | Russell | ................. B23B 45/003 408/239 R |
| 3,138,183 | A | * | 6/1964 | Stewart | ............... B23B 51/0473 175/325.2 |

| | | | | | |
|---|---|---|---|---|---|
| 3,146,813 | A | * | 9/1964 | Dirksen | .............. B23B 51/0426 408/206 |
| 3,474,838 | A | * | 10/1969 | Emmerich | ................ B27C 3/08 408/214 |
| 3,647,310 | A | * | 3/1972 | Morse | ................. B23B 51/0426 408/239 R |
| 3,778,179 | A | * | 12/1973 | Rivas | ...................... B23B 51/04 125/20 |
| 4,076,444 | A | * | 2/1978 | Siebrecht | ............... B23Q 1/703 408/226 |
| 4,474,513 | A | * | 10/1984 | Salyers | ................. B25B 13/481 408/110 |
| 4,968,189 | A | * | 11/1990 | Pidgeon | .............. B23B 51/0426 408/209 |

(Continued)

FOREIGN PATENT DOCUMENTS

| | | | | |
|---|---|---|---|---|
| CA | 2323976 | A1 | * | 4/2002 |
| GB | 2490201 | A | * | 10/2012   ............. B23B 41/02 |

(Continued)

*Primary Examiner* — Nicole N Ramos

(74) *Attorney, Agent, or Firm* — Lewis M Brande; Law Office of Lewis Brande

(57) ABSTRACT

This invention provides the means for construction crews to easily drill through multiple beams or soffits with the use of a hole saw that is coupled to a first drive cup using a coupling arbor. The first drive cup is attached to a first end of an extension tube and is secured using self-tapping screws. A second drive cup is attached to a second end of the extension tube with self-tapping screws where a drive coupling arbor provides a hexagonal shank that is attached to a drive device, such as a hammer drill or standard drill. When activated the rotational motion allows the hole saw to cut through the beams or soffits. A pilot bit is provided to guide the hole saw into the beams or soffits when in use.

11 Claims, 5 Drawing Sheets

(56) References Cited

U.S. PATENT DOCUMENTS

Figure 1:
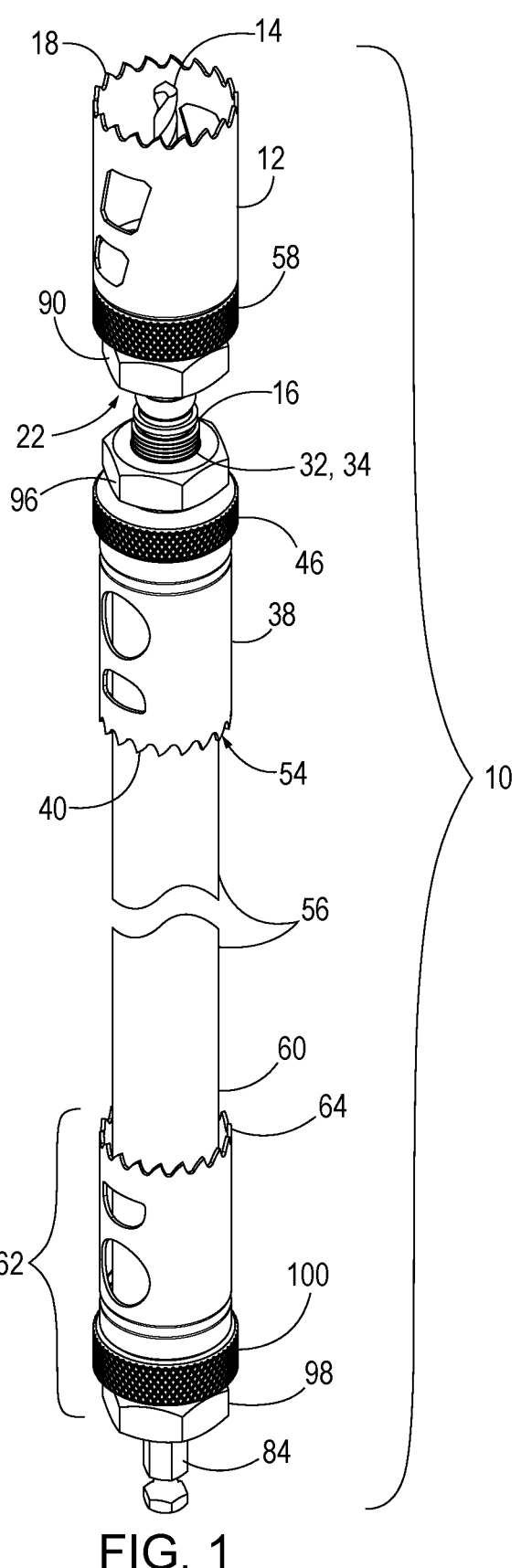

| | | | | |
|---|---|---|---|---|
| 5,352,071 | A * | 10/1994 | Cochran | B23B 51/0473 |
| | | | | 408/703 |
| 5,413,437 | A * | 5/1995 | Bristow | B23B 51/0426 |
| | | | | 408/209 |
| 5,624,213 | A * | 4/1997 | Anderson | B23B 51/0473 |
| | | | | 408/124 |
| 5,624,214 | A * | 4/1997 | Carroll | B23Q 1/703 |
| | | | | 408/239 R |
| 5,829,929 | A * | 11/1998 | Lewis | B23B 51/0473 |
| | | | | 408/209 |
| 5,868,532 | A * | 2/1999 | Spenser | B23B 51/0473 |
| | | | | 408/233 |
| 6,171,033 | B1 * | 1/2001 | Wrobel | B23B 51/126 |
| | | | | 408/239 R |
| 6,881,017 | B1 * | 4/2005 | Krecek | B23B 51/0426 |
| | | | | 408/239 R |
| 7,384,222 | B2 | 6/2008 | Chao | |
| 7,556,459 | B2 | 7/2009 | Rompel | |
| 7,658,136 | B2 | 2/2010 | Rompel et al. | |
| 10,421,132 | B1 * | 9/2019 | Riffell | B23B 51/126 |
| 2003/0063956 | A1 * | 4/2003 | Burk | B23B 51/04 |
| | | | | 408/209 |
| 2005/0244238 | A1 * | 11/2005 | Burk | B23B 51/0426 |
| | | | | 408/204 |
| 2010/0111624 | A1 * | 5/2010 | Seibold | B23B 51/0473 |
| | | | | 408/239 R |
| 2011/0052340 | A1 | 3/2011 | Kozak | |
| 2011/0217134 | A1 * | 9/2011 | Rizzo | B23B 51/08 |
| | | | | 408/209 |

FOREIGN PATENT DOCUMENTS

| | | | | | |
|---|---|---|---|---|---|
| JP | 58010415 | A * | 1/1983 | | |
| KR | 200427074 | Y1 * | 9/2006 | | B23B 51/05 |
| WO | WO-2018198977 | A1 * | 11/2018 | | B27C 3/08 |

* cited by examiner

SOFFIT SAW AND EXTENSION

I. BACKGROUND OF THE INVENTION

1. Field of the Invention

The present invention relates to hole cutting and, more particularly, to a hole saw with a twist drill bit including a pilot tip and an extension that remains in the wall, or soffit and can be used to make easier drilled penetrations by extending a hole saw's reach to the full extent of a pipe or tube.

2. Description of the Prior Art

In the following detailed description preferred embodiments of the invention will be described. However, it is to be understood that features of the different embodiments are exchangeable between the embodiments and may be combined in different ways, unless anything else is specifically indicated. It may also be noted that, for the sake of clarity, the dimensions or certain components illustrated in the drawings may differ from the corresponding dimensions in real-life implementations. Even though in the following description, numerous specific details are set forth to provide a more thorough understanding or the present invention, it will be apparent to one skilled in the art that the present invention may be practiced without these specific details. In other instances, well known constructions or limitations are not described in detail, so as not to obscure the present invention.

The current state of the art in hole drilling would be a standard hole saw as sold by many companies. Typically, they consist of a pilot drill bit and an additional tube of the correct diameter that has cutting teeth on one end, the opposing end being attached to a drill or such device.

Hole saws are used in the construction industry for drilling holes which generally include a diameter of greater than 9/16 inch. Hole saws are used to provide holes in electric panels, wood, or metal studs. The holes must be drilled accurately and quickly. This enables the workpiece to be smooth around the area of the drilled hole to prevent chaffing. In order to provide correct placement of the hole, it is common to have a pilot hole provided that is located in the center of the annular saw. Most common is that a drill bit is fixed to the center of the saw to provide the proper location of the hole. What makes the present invention different is that an extension to the drive is provided so that the proper tube diameter may be inserted and continuously guide the hole saw for ten (10) feet through many soffits as opposed to only being able to provide a singular hole for each soffit. By adding the ability to drive the saw over ten (10) feet, one location may drill through many soffits and provide a more linear pipe run.

The ordinary person skilled in the art (POSITA) realizes that the present invention by no means is limited to the preferred embodiments described above. On the contrary, many modifications and variations are possible within the scope of the appended claims. Such and other modifications should be construed to Fall within the scope of the appended claims.

3. SUMMARY OF THE INVENTION

Current state of the art of hole saws provide for the ability to only drill through one soffit causing the worker to relocate to the next subsequent soffit and drill another hole that is hopefully in-line with the prior drilled hole. This process is repeated as many times as necessary, and when complete, the pipe is inserted through the series of holes, hopefully without any mislocation. To eliminate the repetitive process of relocating to drill another "in-line" hole for a pipe, an adapter is provided that securely locks the hole-saw in place and has provisions to thread onto a tube. The hole-saw has provisions that allow it to thread onto the adapter. The adapter has a hollow shaft toat allows the

II. BRIEF DESCRIPTION OF THE DRAWINGS

FIG. 1. Shows an overall top isometric view of the hole saw with the extension tube.

Figure 2:
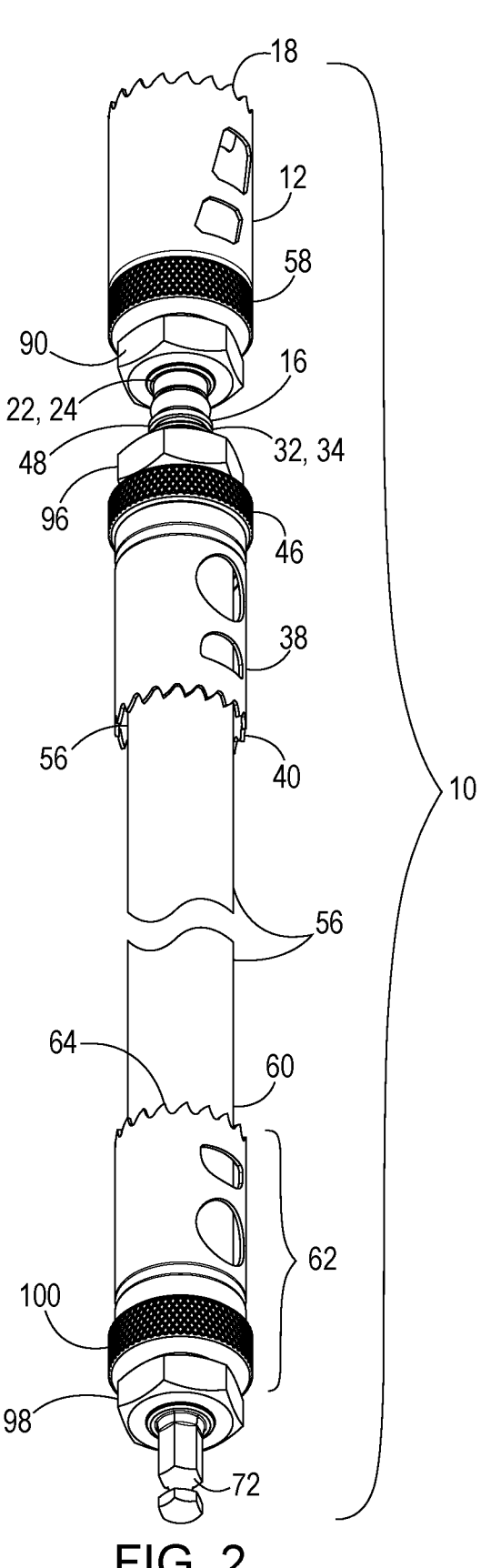

FIG. 2. Shows an overall bottom isometric view of the hole saw with the extension tube.

Figure 3:
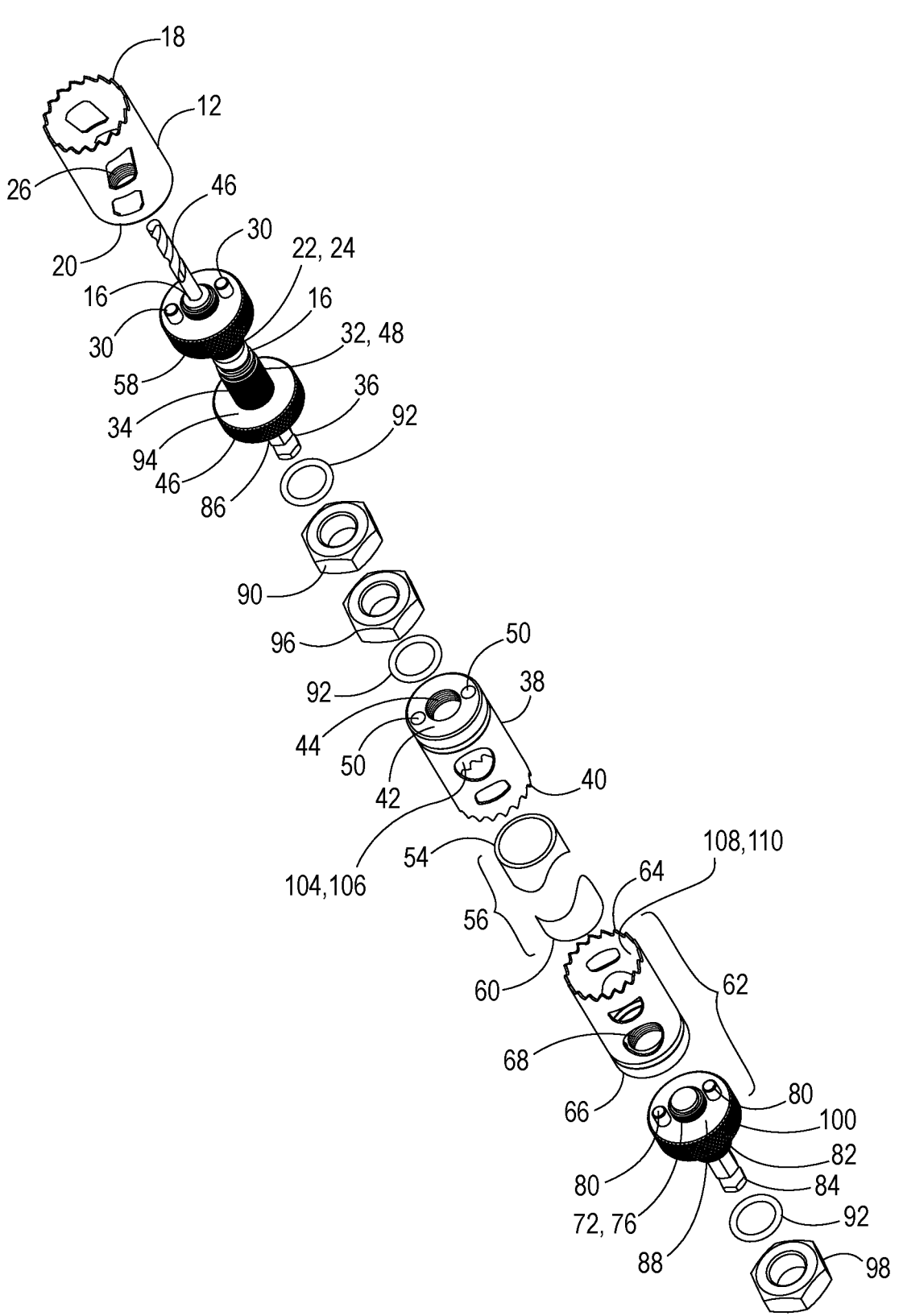

FIG. 3. Shows an exploded view of the soffit saw components with the extension tube.

Figure 4:
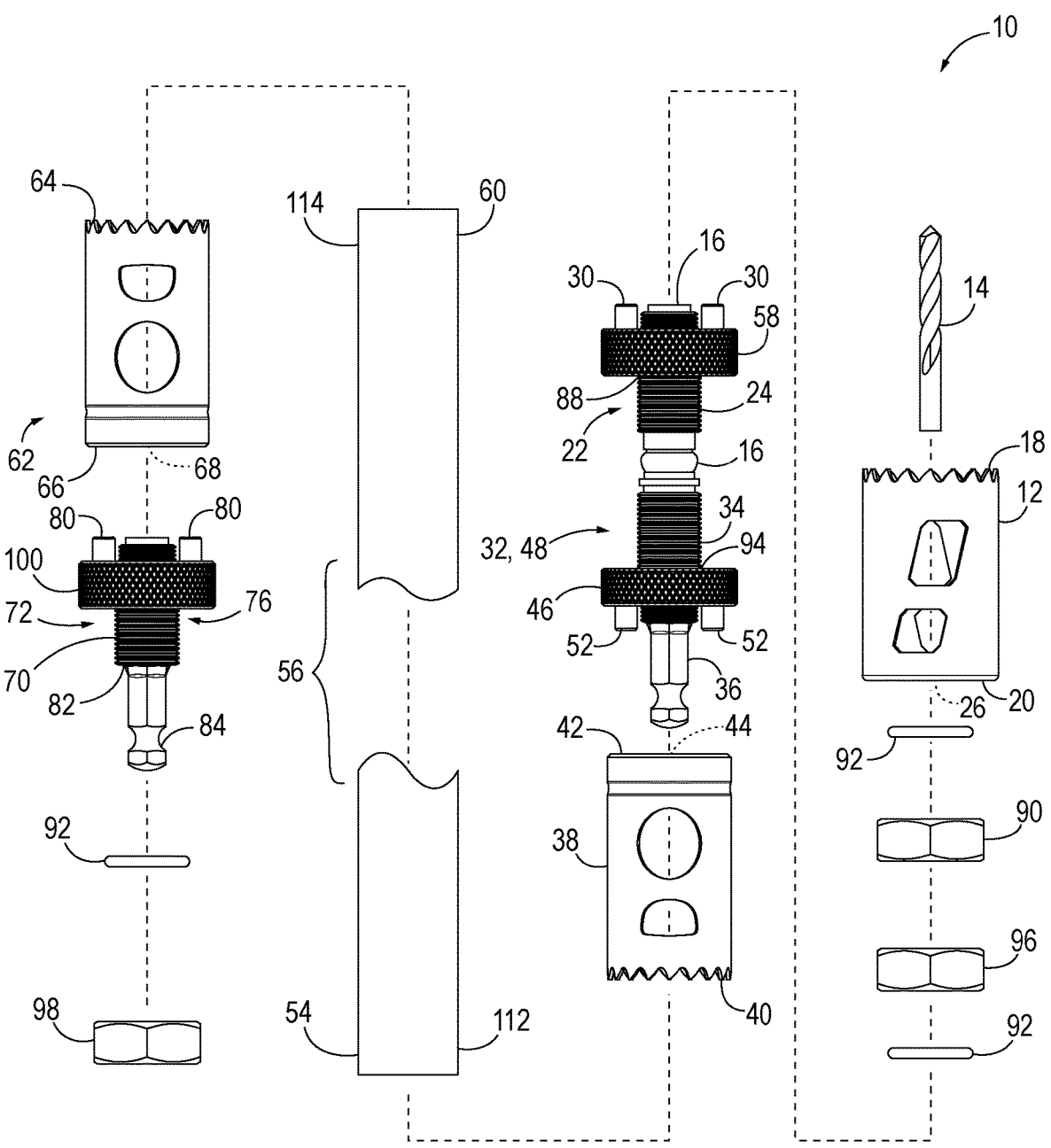

FIG. 4. Shows an overall top exploded view of the hole saw with the extension tube.

Figure 5:
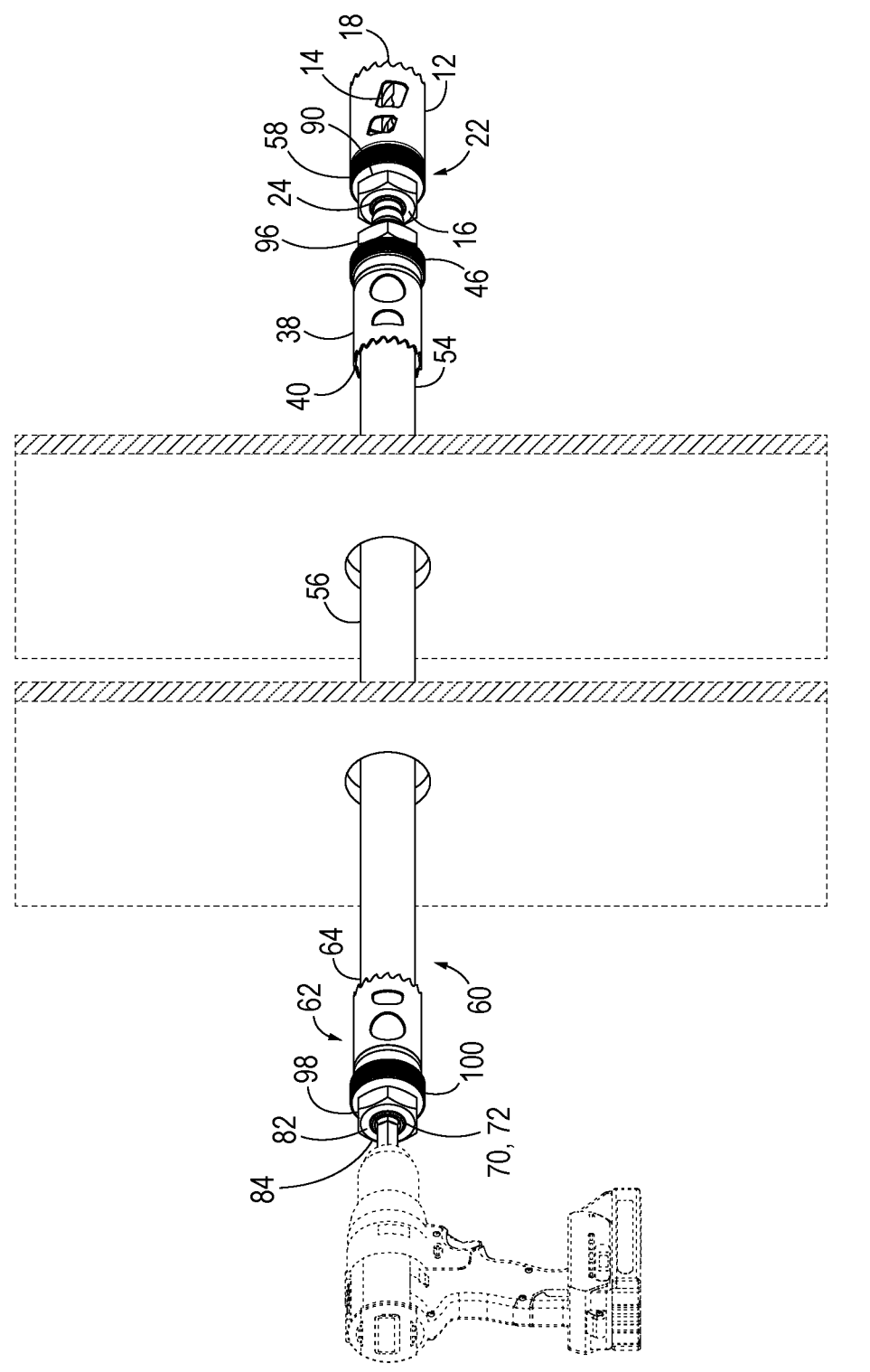

FIG. 5. Shows an overall isometric view of the hole saw with the extension tube and the drive motor penetrating two joists.

III. DETAILED DESCRIPTION OF THE PREFERRED EMBODIMENTS

FIG. 1 shows an illustration of the Soffit Saw and Extension (10). The Soffit Saw and Extension (10) consists of a first hole saw (12), which in this case is the primary cutting implement for the Soffit Saw and Extension (10). The first hole saw (12) consists of a central pilot bit (14), where the pilot bit is a small drill bit that is used to drill a guide hole for a larger drill bit. By drilling a hole with the pilot bit (14), the first hole saw (12) is able to easily bore a hole in the proper dimension. The first hole saw (12) is essentially cup-shaped, having elongated sides terminating in a plurality of cutting teeth (18). The first hole saw (12) also has a base (20), where the base (20) has a centrally threaded hole (26) that threads onto a first threaded portion (24) of a coupling arbor (16). The first threaded portion (24) of the coupling arbor (16) has a central hole (102) that fixes the central pilot bit (14) by either a press fit or by threadably securing the central pilot bit (14) into the coupling arbor (16). The first hole saw (12) threadably attaches to the first threaded portion (24) of the coupling arbor (16). This secures the central pilot bit (14) and the first hole saw (12) to prevent adverse rotational and translational movement when in use. The central pilot bit (14) is centrally positioned along the axis of the first hole saw (12) thereby providing an initial bite into a beam or soffit to drill a hole through. The first hole saw (12) defines the cutting diameter of the hole that will be cut into the intended workpiece. Generally, the cutting diameter of the cylindrical hole saw will be greater than 9/16 inch in diameter.

The coupling arbor (16) has a first retainer plate (58) that is slideably positioned on the first portion (22) of the coupling arbor (16). The first retainer plate (58) has a centrally located clearance hole (88) that allows for a slip fit around the first threaded portion (24) of the coupling arbor (16). A first retaining nut (90) is threadably placed on the first threaded portion (24) of the coupling arbor (16). A grommet (92) is placed between the first retaining nut (90) and the first retainer plate (58). The first hole saw (12) has two cylindrical cutouts (28) (hidden in views) that are positionally aligned with corresponding cylindrical bosses (30) on the first retainer plate (58). The first retainer plate

(58) rotationally secures the first hole saw (12) onto the coupling arbor (16) when the first retainer plate (58) is slidably moved to allow the cylindrical bosses (30) to engage the cylindrical cutouts (28) (hidden in views). The first retaining nut (90) rotatably secures the first retainer plate (58) by tightly bearing against the grommet (92) and the first retainer plate (58).

The coupling arbor (16) has a second opposing end (32). The second opposing end (32) has a second threaded portion (34). The second threaded portion (34) of the coupling arbor (16) has a central hexagonal hole (86) that has a hexagonal shank (36) that is press fit into the hexagonal hole (86). A first drive cup (38) is essentially cup-shaped, having elongated sides terminating in a plurality of cutting teeth (40), and having a base (42), where the base (42) has a centrally located threaded hole (44) that threads onto the second threaded portion (34) of the coupling arbor (16). The coupling arbor (16) further has a second retainer plate (46) that has a centrally located clearance hole (94) that is slideably positioned on the second portion (48) of the coupling arbor (16). The first drive cup (38) has two cylindrical cutouts (50) that are positionally aligned with corresponding cylindrical bosses (52) on the second retainer plate (46), where the cylindrical bosses (52) rotationally secure the first drive cup (38) onto the coupling arbor (16) when the second retainer plate (46) is slidably positioned to allow the cylindrical bosses (52) on the second retainer plate (46) to engage the cylindrical cutouts (50) on the first drive cup (38). A second retaining nut (96) rotatably secures the second retainer plate (46) by tightly bearing against the grommet (92) and the second retainer plate (46). The first drive cup (38) has a diameter that is selected to allow a slip fit on to a first end (54) of an extension tube (56). In addition, self-tapping fasteners (not shown) are added to prevent the extension tube (56) from rotating when in use. The first drive cup (38) has an interior surface (104), the interior surface (104) has threading (106) that will allow the first drive cup (38) to threadably engage a first threaded portion (112) of the extension tube (56). The extension tube (56) has a second end (60) that opposes the first end (54). The second end (60) is adapted to receive a second drive cup (62) that will slip fit onto the extension tube (56) and use self-tapping screws (not shown) to secure the second drive cup (62) to the second end (60) of the extension tube (56). Some extension tubes (56) may be rigid or semi-rigid and will have the first threaded portion (112) on the first end (54) of the extension tube, and will have a second threaded portion (114) on the second end (60) of the extension tube (56).

A drive coupling arbor (72) is provided that has a threaded portion (70). The second drive cup (62) is essentially cup-shaped, having elongated sides terminating in a plurality of cutting teeth (64). The second drive cup (62) also has a base (66), where the base (66) has a centrally threaded hole (68) that threads onto the threaded portion (70) of the drive coupling arbor (72). The second drive cup (62) threadably attaches to the threaded portion (70) of the drive coupling arbor (72). This secures the second drive cup (62) to prevent adverse rotational and translational movement when in use. The second drive cup (62) is sized specifically to provide a tight friction fit to the extension tube.

The drive coupling arbor (72) has a third retainer plate (100) that has a centrally located clearance hole (102) and is slidably positioned on the first portion (76) of the drive coupling arbor (72). The second drive cup (62) has two cylindrical cutouts (78) (hidden in views) that are positionally aligned with corresponding cylindrical bosses (80) on the second retainer plate (46) that rotationally secures the second drive cup (62) onto the coupling arbor (16) when the cylindrical retainer plate (58) is slidably moved to allow the cylindrical bosses (30) to positionally engage the cylindrical cutouts (28) (hidden in views). A third retaining nut (98) is rotated to secure the third retainer plate (100) by tightly bearing against a grommet (92) and the third retainer plate (100). The threaded portion (70) of the drive coupling arbor (72) has a central hexagonal hole (82) that has a hexagonal shank (84) that is press fit into the central hexagonal hole (82) and may be attached to a drill chuck. The second drive cup (62) has an interior surface (108), the interior surface (108) has threading (110) that will allow the second drive cup (62) to threadably engage the second threaded portion (114) of the extension tube (56).

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A soffit saw and extension, comprising:
   a) a coupling arbor, the coupling arbor having a first portion and a second opposing end, the first portion of the coupling arbor having a first threaded portion, the second opposing end having a second threaded portion, the first portion having means to attach a pilot bit, the second opposing end having means to attach a hexagonal shank;
   b) a first hole saw having extended sides that have cutting teeth, and a base, the base having a centrally threaded hole defined therein, the centrally threaded hole on the base threadably attaching to the first threaded portion of the coupling arbor, the coupling arbor having a first means to secure the first hole saw;
   c) a first drive cup having extended sides that have cutting teeth, and a base, the base having a centrally threaded hole defined therein, the centrally threaded hole on the base of the first drive cup threadably attaching to the second threaded portion of the coupling arbor, the coupling arbor having a second means to secure the first drive cup of the first hole saw, the base further having two cylindrical holes defined therein;
   d) an extension tube, the extension tube having a first end and a second end, the first end of the extension tube having a threaded portion to threadably attach the first drive cup rotationally securing the first drive cup to the first end of the extension tube;
   e) a drive coupling arbor, the drive coupling arbor having a threaded portion, the drive coupling arbor having a hexagonal hole defined therein, the hexagonal hole providing for a press fit for a hexagonal shank;
   f) a second drive cup, the second drive cup having extended sides that have cutting teeth, and a base, the base having a centrally threaded hole defined therein, the centrally threaded hole on the base of the first drive cup threadably attaching to a threaded portion of the drive coupling arbor, the base of the second drive cup having cylindrical holes defined therein, the drive coupling arbor having a third means to secure the second drive cup to the extension tube; and
   g) the second drive cup having a threaded portion to threadably attach the second end of the extension tube, the second drive cup is rotationally secure the second drive cup to the second end of the extension tube.

2. The soffit saw and extension of claim 1, wherein the first means to rotationally secure the first drive cup to the first end of the extension tube comprises the first drive cup having an inner surface, the inner surface having a threaded portion adapted to thread onto a first threaded portion of the extension tube.

3. The soffit saw and extension of claim 1, wherein the second means to rotationally secure the second drive cup to the second end of the extension tube comprises the second drive cup having an inner surface, the inner surface having a threaded portion adapted to thread onto a second threaded portion of the extension tube.

4. The soffit saw and extension of claim 1, wherein the means to attach the pilot bit comprises:

the first portion of the coupling arbor having a centrally located hole defined therein, the centrally located hole providing for a press-fit for the centrally located pilot bit.

5. The soffit saw and extension of claim 1, wherein the means to attach the hexagonal shank comprises:

the second opposing portion of the coupling arbor having a central hexagonal hole defined therein, the central hexagonal hole providing for a press-fit for the hexagonal shank.

6. The soffit and extension of claim 1, wherein the first means to secure the first hole saw comprises:

a) a first retainer plate, the first retainer plate having a centrally located clearance hole defined therein the centrally located clearance hole allows for a slip fit around the first threaded portion of the coupling arbor, the first retainer plate having cylindrical bosses defined thereon, the cylindrical bosses are positionally aligned with the cylindrical holes on the first base of the first hole saw;

b) a nut, the nut threadably engaging the first threaded portion of the coupling arbor, forcing a grommet to tightly bear against the first retainer plate with the cylindrical bosses on the first retainer plate aligned with the cylindrical holes on the base of the first hole saw.

7. The soffit saw and extension of claim 1, wherein the second means to secure the first drive cup comprises:

a) a second retainer plate, the second retainer plate having a centrally located clearance hole defined therein, the centrally located clearance hole allows for a slip fit around the second threaded portion of the coupling arbor, the second retainer plate having cylindrical bosses defined thereon, the cylindrical bosses are positionally aligned with the cylindrical holes on the first drive cup; and b) a nut, the nut threadably engaging the second threaded portion of the coupling arbor, forcing a grommet to tightly bear against the second retainer plate with the cylindrical bosses on the second retainer plate aligned with the cylindrical holes on the base of the first drive cup.

8. The soffit saw and extension of claim 1, wherein the third means to secure the second drive cup to the extension tube comprises:

a) a third retainer plate, the third retainer plate having a centrally located clearance hole defined attach, the centrally located clearance hole allows for a slip fit around the threaded portion of the drive coupling arbor, the third retainer plate having cylindrical bosses defined thereon, the cylindrical bosses are positionally aligned with the cylindrical holes on the base of the second drive cup; and b) a nut, the nut threadably engaging the threaded portion of the drive coupling arbor, forcing a grommet to tightly bear against the third retainer plate with the cylindrical bosses on the third retainer plate positionally aligned with the cylindrical cutouts on the base of the second drive cup.

9. A soffit saw and extension, comprising:

a) a first hole saw, the first hole saw being cup shaped and having extended sides terminating in cutting teeth, the first hole saw further having a base, the base having a centrally threaded hole defined therein;

b) a coupling arbor, the coupling arbor having a first portion, the first portion having a first threaded portion the first threaded portion threadably receiving the centrally threaded hole in the first hole saw, the first threaded portion of the coupling arbor having a central hole defined therein, the central hole positioning and fixing a centrally located pilot bit central pilot bit, the centrally located pilot bit being fixed by either a friction fit or by threadably securing the central pilot bit into the coupling arbor;

c) a first retainer plate is slideably positioned on the first portion of the coupling arbor, the first retainer plate having a centrally located clearance hole defined therein, the centrally located clearance hole allows for a slip fit around the first threaded portion of the coupling arbor;

d) a first retaining nut is threadably placed on the first threaded portion of the coupling arbor, a first grommet is placed between the retaining nut and the first retainer plate;

e) the base of the first hole saw further having cylindrical cutouts defined therein, the cylindrical cutouts in the base of the first hole saw slideably receiving cylindrical bosses on the first retainer plate;

f) the cylindrical cutouts in the base of the first hole saw are positionally aligned with corresponding cylindrical bosses on the first retainer plate that rotationally secures the first hole saw onto the coupling arbor when the first retainer plate is slidably moved to allow the cylindrical bosses to engage the cylindrical cutouts, the first retaining nut rotatably secures the first retainer plate by tightly bearing against the first grommet and the first retainer plate;

g) the coupling arbor has a second opposing end, the second opposing end having a second threaded portion defined thereon, the second threaded portion of the coupling arbor having a central hexagonal hole defined therein, allowing a hexagonal shank to be secured into the hexagonal hole;

h) a first drive cup is cup-shaped, and having elongated sides terminating in a plurality of cutting teeth, and further having a base, where the base has a centrally located threaded hole defined therein, where the centrally threaded hole of the first drive cup is threadably secured onto the second threaded portion of the coupling arbor;

i) the coupling arbor has a second retainer plate defined thereon, the second retainer plate has a centrally located clearance hole defined therein, the second retainer plate is slideably positioned on the second threaded portion of the coupling arbor;

j) the base of the first drive cup has two cylindrical holes defined therein where the cylindrical cutouts are positionally aligned with corresponding cylindrical bosses positioned on the second retainer plate thereby rotationally securing the first drive cup onto the coupling arbor when the second retainer plate is slidably positioned to allow the cylindrical bosses to engage the cylindrical cutouts on the second hole saw, a second retaining nut rotatably secures the second retainer plate by tightly bearing against a second grommet and the second retainer plate, the first drive cup has a diameter that is selected to allow a slip fit on to a first end of an extension tube, the first drive cup has a first means to rotationally secure the extension tube to the first drive cup and drive the extension tube when in use;

k) the extension tube has a second end opposing the first end, where the second end of the extension tube is adapted to receive a second drive cup, the second drive cup is threaded onto the second end of the extension tube rotationally securing the second drive cup, to the second end of the extension tube, a third retaining nut rotatably secures the third retainer plate by tightly bearing against a third grommet and the third retainer plate, the second drive cup is cup-shaped, having elongated sides terminating in a plurality of cutting teeth, the second drive cup also has a base, where the base has a centrally threaded hole defined therein allowing the second drive cup to threadably engage a threaded portion of a drive coupling arbor, securing the second drive cup and prevents adverse rotational and translational movement when in use, the second drive cup has a tight friction fit onto the extension tube;

l) the drive coupling arbor has a third retainer plate, the third retainer plate has a centrally located clearance hole defined therein, and is slideably positioned on the first portion of the drive coupling arbor;

m) the base of the second drive cup has two cylindrical holes defined therein, and are positionally aligned with corresponding cylindrical bosses on the third retainer plate rotationally securing the second drive cup onto the coupling arbor when the cylindrical retainer plate is slidably moved to causing the cylindrical bosses on the third retainer plate to engage the cylindrical cutouts in the base of the drive coupling arbor, a third retaining nut rotatably secures the third retainer plate by tightly bearing against the third grommet and the third retainer plate, the threaded portion of the drive coupling arbor having a central hexagonal hole defined therein allowing a hexagonal shank to be press fit into the central hexagonal hole, the hexagonal shank is attached to a drill chuck; and n) the second drive cup provides rotational motion from a drive device to the extension tube causing the first drive cup to rotate thereby causing the first hole saw to cut through a beam or soffit.

10. The soffit saw and extension of claim 9, wherein the first drive cup is rotationally secured to the first end of the extension tube comprises the first drive cup having an inner surface, the inner surface having threading adapted to thread onto a first threaded portion of the extension tube.

11. The soffit saw and extension of claim 9, wherein the second drive cup is roationally secured to the second end of the extension tube comprises the second drive cup having an inner surface, the inner surface having threading adapted to thread onto a second threaded portion of the extension tube.

\* \* \* \* \*